(12) United States Patent
Steiner et al.

(10) Patent No.: US 12,444,931 B2
(45) Date of Patent: Oct. 14, 2025

(54) ELECTRICAL ARRANGEMENT FOR DIRECT CURRENT ELECTRIC SYSTEMS

(71) Applicant: Airbus (S.A.S.), Blagnac (FR)

(72) Inventors: Gerhard Steiner, Mindelheim (DE); Florian Kapaun, Kirchseeon (DE)

(73) Assignee: Airbus (S.A.S.), Blagnac (FR)

( * ) Notice: Subject to any disclaimer, the term of this patent is extended or adjusted under 35 U.S.C. 154(b) by 165 days.

(21) Appl. No.: 18/230,991

(22) Filed: Aug. 7, 2023

(65) Prior Publication Data

US 2024/0055852 A1 Feb. 15, 2024

(30) Foreign Application Priority Data

Aug. 9, 2022 (EP) ..................................... 22189477

(51) Int. Cl.
*H02H 9/02* (2006.01)
*H02H 3/087* (2006.01)
(Continued)

(52) U.S. Cl.
CPC .............. *H02H 9/02* (2013.01); *H02H 3/087* (2013.01); *H02J 1/00* (2013.01); *H02M 3/158* (2013.01)

(58) Field of Classification Search
CPC ........ H02H 7/1213; H02H 3/087; H02H 3/08; H02H 9/02–028; H02M 3/00–44; H02J 1/00–16
See application file for complete search history.

(56) References Cited

U.S. PATENT DOCUMENTS 4,528,536 A * 7/1985 Blewitt .................. H01H 85/38
337/5
2015/0084424 A1 3/2015 Zeuch
(Continued)

FOREIGN PATENT DOCUMENTS

DE 102016203190 A1 * 6/2017
WO 2018060756 A1 4/2018

OTHER PUBLICATIONS

Translation of DE 102016203190A1. Jun. 22, 2017. (Year: 2017).*
European Search Report for Application No. 22189477 dated Jan. 30, 2023.

*Primary Examiner* — Thienvu V Tran
*Assistant Examiner* — Christopher J Clark
(74) *Attorney, Agent, or Firm* — KDW Firm PLLC

(57) ABSTRACT

An electrical arrangement for protection in a direct current electric system includes an input connection, positive and negative input terminals, an output connection with positive and negative output terminals, and a stepping converting component with a switching topology with first and second positive connectors and a ground connector. A first switch is between the first and second positive connectors, and a second switch is between the second positive connector and the ground connector. The negative input terminal and the negative output terminal connect via the ground connector. The one switching topology is connected to the positive input terminal, the positive output terminal, and to the interconnected negative input and output terminals. The stepping converting component provides an operation switching mode for normal operation of the direct current electric system and to provide an overcurrent switching mode for overcurrent operation of the direct current electric system.

15 Claims, 4 Drawing Sheets

(51) Int. Cl.
*H02J 1/00* (2006.01)
*H02M 3/158* (2006.01)

(56) References Cited

U.S. PATENT DOCUMENTS

| | | | |
|---|---|---|---|
| 2015/0130476 A1* | 5/2015 | Takahashi | H02H 7/1213 |
| | | | 324/537 |
| 2019/0173388 A1* | 6/2019 | Suryanarayana | H02M 3/33592 |
| 2021/0184596 A1* | 6/2021 | Frampton | H02M 1/0043 |
| 2022/0181867 A1* | 6/2022 | Cao | H02H 9/02 |

* cited by examiner

ELECTRICAL ARRANGEMENT FOR DIRECT CURRENT ELECTRIC SYSTEMS

TECHNICAL FIELD

The disclosure herein relates to high power direct current electric networks. The disclosure herein relates, in particular, to an electrical arrangement for protection, to an electric system and to a method for protection in a direct current electric system.

BACKGROUND

Switching and protection of high power direct current electric networks is of high relevance for example for the operation of high performance electric motors, engines or actuators. In common examples, their basic functionality is ensured by the combination of a fuse and a power contactor. Yet, a short circuit in combination with a powerful energy source or network may lead to overload or damage of the contactor and insufficient fault clearing time. Moreover, a combination of fuse in series with contactors has to be precisely matched to ensure protection to overload and short circuit over the whole operational range. Furthermore, the aging of fuses must also be taken into account.

SUMMARY

There may thus be a need for improved protection and switching of direct current electric systems and networks.

The object of the disclosure herein is solved by the subject-matter disclosed herein. It should be noted that the following described aspects of the disclosure herein apply also for the electric system with direct current network, and for the method for protection in a direct current electric system.

According to the disclosure herein, an electrical arrangement for protection in a direct current electric system is provided. The arrangement comprises an input connection with a positive input terminal and a negative input terminal. The arrangement also comprises an output connection with a positive output terminal and a negative output terminal. The arrangement further comprises a stepping converting component with at least one switching topology that has a first positive connector, a second positive connector and a ground connector. A first switch is arranged between the first positive connector and the second positive connector. A second switch is arranged between the second positive connector and the ground connector. The negative input terminal and the negative output terminal are connected via the ground connector. The at least one switching topology is connected to the positive input terminal by the first positive connector, to the positive output terminal by the second positive connector, and to the interconnected negative input and output terminals by the ground connector. The stepping converting component is configured to provide an operation switching mode for normal operation of the direct current electric system and to provide an overcurrent switching mode for overcurrent operation of the direct current electric system. A control signal for triggering a change from the operation switching mode to the overcurrent switching mode is also provided in case a current within the electrical arrangement exceeds a predetermined threshold.

As an advantage, no capacitors are required and therefore weight and outline, i.e. size, of the arrangement and complexity of the arrangement are reduced.

According to an example, in the operation switching mode, the first switch is in a conducting state and the second switch is in a non-conducting state. In the overcurrent switching mode, the first switch is at least temporarily in a non-conducting state and the second switch is at least temporarily in a conducting state.

As an option, the first switch and the second switch are clocked to alter between different switching states during the overcurrent switching mode. In the overcurrent switching mode, the clocking triggers different combinations of the conducting state and non-conducting state of the first switch and the second switch.

As an option, the switches are designed to operate mostly in the operation switching mode for normal operation.

According to an example, the at least one switching topology is provided as a half-bridge module, e.g. realized as a semiconductor circuit.

As an advantage, a shorter reaction time and faster protection of the direct current network are provided. Further, as another advantage, enhanced functionality is provided by the semiconductor circuits.

As an option, the stepping converting component is provided as semiconductor circuit.

As a further option, a switching by the semiconductor circuits within less than a few microseconds is provided.

According to an example, the arrangement further comprises an inductive element. The inductive element is connected to the second positive connector of the at least one switching topology. The inductive element is configured to take up changes in current. Also, the inductive element is configured to redistribute inductive energy across the network.

According to a further aspect, a bi-directional voltage converter is provided.

According to an example, the stepping converting component comprises at least a second switching topology with a first positive connector, a second positive connector, a ground connector, a first switch and a second switch. The second positive connector of the first switching topology is connected to the second positive connector of the second switching topology. The first switch of the second switching topology is arranged between the second positive connector and the first positive connector of the second switching topology. The second switch of the second switching topology is arranged between the second positive connector and the ground connector of the second switching topology. The first positive connector of the second switching topology is connected to the positive output terminal. The first switching topology and the second switching topology form a bidirectional topology.

As an option, the first switching topology is configured to conduct changes in a current of a source circuit. As a further option, the second switching topology is configured to conduct changes in a current of a load circuit. As a still further option, the stepping converting component is configured to redistribute the changes in current in the network.

According to an aspect, two switching topologies are provided that are connected in an opposing manner. One of the two switching topologies provides protection in a first current direction and the other one of the two switching topologies provides protection in a second current direction.

As an advantage, the arrangement provides protection of the direct current network from short circuits from the input side and the output side of the network.

According to an example, the inductive element is connected between the first switching topology and the second switching topology. The inductive element is configured to take up current by the first switching topology from the source circuit and/or by the second switching topology from the load circuit. Also, the inductive element is configured to redistribute inductive energy across the network by the first switching topology and the second switching topology.

According to an example, an arrangement is provided with at least two stepping converting components each having at least one switching topology, which are connected in parallel to the input and output terminals.

As an option, one stepping converting component of the at least two stepping converting components is configured to operate if the other stepping converting component of the at least two stepping converting components fails. Further, the one stepping converting component is configured to take up current of the other stepping converting component.

As an advantage, the two stepping converting components provide increased redundancy.

According to the disclosure herein, also an electric system with a direct current network is provided. The system comprises at least one of the group of a source and a load. The system also comprises an electrical arrangement according to one of the preceding examples and following aspects. The source and the load are connectable by the electrical arrangement. The source is selected from the group of: batteries, super capacitors, fuel cells, solar cells, power network and combinations thereof. The load comprises at least one of the group of: electrical engines, electric drives and motors, electric actuators.

In an example, the source and the load are provided connected by the electrical arrangement.

According to the disclosure herein, also a method for protection in a direct current electric system is provided. The method comprises the following steps:

Applying a current to a direct current electric system comprising an electrical arrangement according to one of the previous aspects or examples;

Providing a control signal triggering a change from an operation switching mode to the overcurrent switching mode in case a current within the electrical arrangement exceeds a predetermined threshold; and Changing modes of the switches based on the control signal.

According to an aspect, a contactor for switching and protection of high power direct current electric networks is provided. The contactor comprises semiconductor switches and an inductive element. The semiconductor switches can be switched at a higher frequency than conventional contactors and are only switched in case of overvoltage or short circuits of the system. Due to the combination of inductive element and semiconductor switches, overvoltage can be stepped down and degraded, such that no damage at the electric network is caused. In case the arrangement cannot work properly, as an option, an additional pyro-fuse is provided to interrupt current flow.

As an effect, the contactor has a short reaction time, provides high redundancy, provides simple and light construction, allows flexible usage and cannot be melted by high currents to conduct current flow.

According to an aspect, an electric current is limited by using semiconductor technology.

Further, as an advantage, the right choice of semiconductor switches can support cooling of the system.

According to an aspect, a circuit is provided that fulfills a completely different function than a normal" DC/DC converter, and is also controlled completely differently. The whole topology behaves more like a switch and not like a converter. This eliminates components such as the capacitors, which contribute significantly to the overall weight. In addition, the topology is operated with much higher switching frequencies, so that the inductance can be very small and thus low impedance. The whole unit is therefore much smaller and lighter than a DC/DC converter. In addition, as an option, two units are connected in parallel. This way, redundancy is achieved, and losses are again reduced. As an option, clock is not provided at all in normal operation. This means no switching losses and pure forward operation. Only in case of overcurrent, the unit clocks to slowly step down the current. This means that no overvoltage occurs in the network and additional and maybe even heavy elements such as spark quenching chamber, e.g. in combination with mechanical switch, as well as elements for clamping the voltage can be omitted. In addition, the switches used can be much better utilized and optimized, since the clocking occurs only for very small periods of time. Since the currents can be detected and controlled much faster, no damage to the source, e.g. battery, occurs. In addition, the whole network can be protected and not only the part that is connected to a single transformer. The circuit is not intended to adjust the voltages of the input and output side, for example, as an DC/DC converter would do.

According to an aspect, the at least one switching topology comprises only the two switches.

As an advantage, in the field of power electronics, the still existing problems for switches and protections in high power DC networks is addressed. High value of safety and high performance is mandatory to ensure a proper operation of such networks. It is provided a hybrid and fully electronic solutions to overcome the existing problems. Furthermore, a redundancy is provided to be able to switch even after the first fault. Also the overvoltage problem during switching or fuse blow is considered. The present proposal describes solutions for switching and protecting high power DC systems, networks and sources/buffers from overload and short circuits. The solutions provide improved flexibility, enhanced performance, redundancy concepts combined with reasonable weight compared to actual solutions. The use of a combination of a fast, powerful and controllable fuse technology and a semiconductor based solution enables enhanced functionalities and redundancy compared to the actual solutions. An optimization of the overall weight is addressed by a short-time, high frequency operation of the converter part. An optimization of the efficiency while keeping the redundancy and full controllability is achieved by using a pyro-fuse as second series switch.

This proposal is intended to be used for network and energy storage reconfiguration, switching and protection.

Due to step-down topology, no overvoltage on the network will occur (controlled reduction of the current down to zero). Due to a voltage limiting device in parallel to the pyro-fuse there will be no severe overvoltage on the network if the pyro-fuse is activated to decouple a faulty step-down converter.

As another effect, redundant "OFF" state capability to clear faults even after first failure is provided. Due to controlled current, the peak current at the network is controlled (normal operation); due to controlled current, an overvoltage at the network is avoided (normal operation); due to the pyro-fuse, with a parallel voltage limiting device (VLC), the "OFF" state can still be realized and the VLC parallel to the pyro-fuse absorbs the inductive energy which is present on the line before switching.

Further benefits are provided by the redundant "ON" and "OFF" state capability to switch even after first failure. Due to the pyro-fuse, a faulty branch can be decoupled by activating the pyro-fuse and therefore "ON" and "OFF" switching is still possible. Due to the parallel architecture of the branches the activation of a pyro-fuse in one faulty branch does not lead to an overvoltage, because the second branch is still active and controllable to "ON" state. The current will be taken by this branch and therefore no current step at the line will lead to overvoltage. Therefore, also VLC in parallel to the pyro-fuse to deal with energies stored on lines or other inductive components is no longer needed.

These and other aspects of the disclosure herein will become apparent from and be elucidated with reference to the embodiments described hereinafter.

BRIEF DESCRIPTION OF THE DRAWINGS

Example embodiments of the disclosure herein will be described in the following with reference to the following drawings.

DETAILED DESCRIPTION

Figure 1:
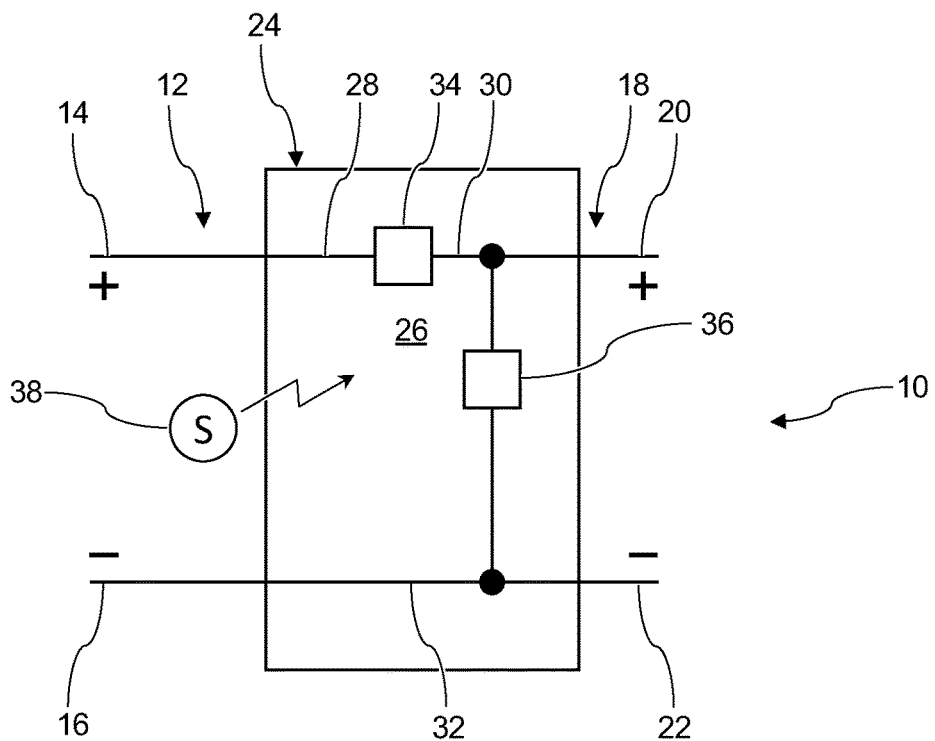
FIG. 1 schematically shows an example of an electric arrangement with one stepping converting component having one switching topology.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the example embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of an electrical arrangement 10 for protection in a direct current electric system. The arrangement 10 comprises an input connection 12 with a positive input terminal 14 and a negative input terminal 16. The arrangement 10 also comprises an output connection 18 with a positive output terminal 20 and a negative output terminal 22. The arrangement 10 further comprises a stepping converting component 24 with at least one switching topology 26 that has a first positive connector 28, a second positive connector 30 and a ground connector 32. A first switch 34 is arranged between the first positive connector 28 and the second positive connector 30; a second switch 36 is arranged between the second positive connector 30 and the ground connector 32. The negative input terminal 16 and the negative output terminal 22 are connected via the ground connector 32. The at least one switching topology 26 is connected to the positive input terminal 14 by the first positive connector 28, to the positive output terminal 20 by the second positive connector 30, and to the interconnected negative input terminals 16 and the output terminals 14 by the ground connector 32.

The stepping converting component 24 is configured to provide an operation switching mode for normal operation of the direct current electric system and to provide an overcurrent switching mode for overcurrent operation of the direct current electric system.

Further, a control signal 38 for triggering a change from the operation switching mode to the overcurrent switching mode is provided in case a current within the electrical arrangement exceeds a predetermined threshold.

A serrated arrow indicates an influence of the control signal 38 on the operation switching mode and the overcurrent switching mode of the switching topology 26.

The term "switching topology" relates to a switching setup and can also be considered as a switching component with a first and second switch element. Further, the switching topology can also be referred to as a half-bridge module, half-bridge device, half-bridge setup or half-bridge component—all having a half-bridge topology. A half-bridge component has a first and second switch element.

The term "electric system" relates to a circuit or network, in which a DC current is provided. The electric system can also be referred to as circuit or network.

The positive input terminal can also be referred to as first input terminal. The negative input terminal can also be referred to as second input terminal.

The positive output terminal can also be referred to as first output terminal. The negative output terminal can also be referred to as second output terminal.

In an example, the term "interconnected" refers to a direct connection of the negative input terminal and the negative output terminal.

The predetermined threshold comprises any parameter associated with electric current: current, voltage or polarity.

The term "operation switching mode" refers to a switching pattern, i.e. pattern of the switches, applied during normal or standard operation, e.g. in a non-overcurrent mode. The operation switching mode can also be referred to as operation mode, normal switching mode or normal state. The operation switching mode can also be referred to as operation switching state.

In an example, after completion of the overload, the longitudinal branch is controlled, and the parallel branch (between plus and minus) is blocked.

The term "overcurrent switching mode" refers to a switching pattern applied during an overcurrent operation, e.g. in an overcurrent mode. The overcurrent switching mode can also be referred to as overcurrent mode, protection switching mode or protection mode.

The overcurrent switching mode can also be referred to as overcurrent switching state.

The term "normal operation" refers to an operation mode of the system where no deviation from a constant current occurs, e.g. below a predetermined maximum threshold value.

The term "overcurrent operation" describes a condition of current in the system, where deviations from a constant current occur comprising overvoltage, circuit short or switching of the direct current network, e.g. above a predetermined maximum threshold value. The overcurrent operation can also be referred to as overload mode.

The normal operation can also be referred to as normal operation mode. The overcurrent operation can also be referred to as overcurrent operation mode.

Figure 2:
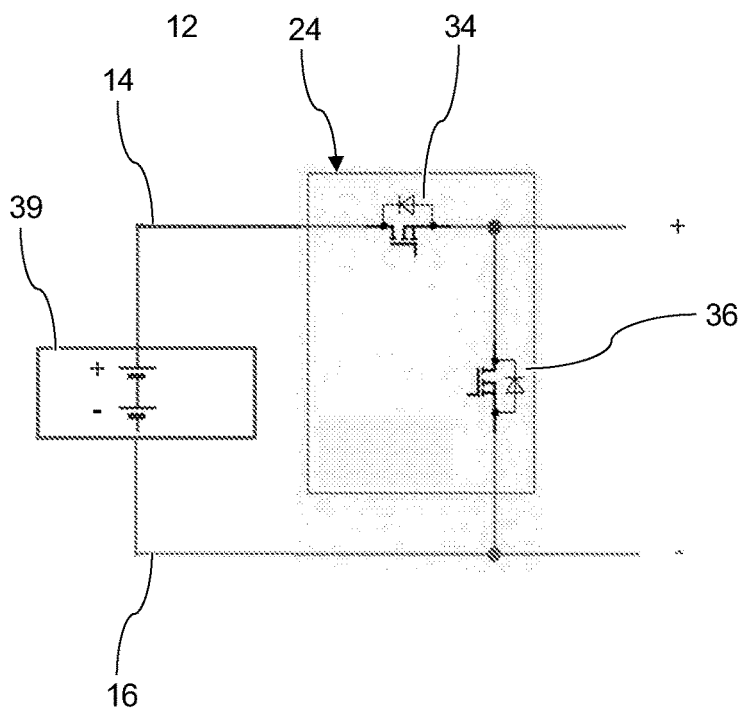
FIG. 2 schematically shows another example of an electric arrangement with one stepping converting component having one switching topology.

FIG. 2 shows as an option that the at least one switching topology 26 is provided as a half-bridge module. As an option, the stepping converting component 24 is provided as semiconductor circuit. In a further option, a switching by the semiconductor circuits within less than a few microseconds is provided.

An electric source 39 is shown as an option. It is noted that the source 39 is also shown in the further figures as an option, but it must be noted that the source is not necessarily a part of the electrical arrangement 10.

In an example, during the overcurrent switching mode, the first switch 34 and second switch 36 are clocked.

In an example, a voltage applied to the input of the arrangement is not rendered to a voltage at the output of the arrangement, that is different from the voltage applied to the input of the arrangement under normal operation.

The switches are not designed for permanent switching, but rather as a protective measure in case of an unexpected overload. Most of the operation time the switches reside in the standard setting, where no incident of overload occurs. In other words, the switches are only used occasionally in a switch-mode operation, for example in a toggled mode, for a minor amount of the whole operation time of the arrangement.

According to an example, not further shown in detail, in the operation switching mode, the first switch 34 is in a conducting state and the second switch 36 is in a non-conducting state. In the overcurrent switching mode, the first switch 34 is at least temporarily in a non-conducting state and the second switch 36 is at least temporarily in a conducting state.

The term "conducting state" relates to a state of the switch, in which the switch transmits electric energy, i.e. electric current can flow via the switch. The term conducting state can also be referred to as connecting state.

The term "non-conducting state" relates to a state of the switch, in which the switch does not transmit electric energy, i.e. electric current does not flow via the switch. The term non-conducting state can also be referred to as non-connecting state.

As an option, the first switch 34 and the second switch 36 are clocked to alter between different switching states during the overcurrent switching mode.

As an option, in the overcurrent switching mode, the clocking triggers different combinations of the conducting state and non-conducting state of the first switch 34 and the second switch 36.

As another option, the switches 34, 36 are designed to operate mostly in the operation switching mode for normal operation.

The term "conducting state" of the switches 34, 36 relates to closed, i.e. contacting and thus conducting contacts for allowing an electric current to flow. The conducting state can also be referred to as closed state or closed conducting state. The term "non-conducting state" of the switches 34, 36 relates to open, i.e. non-contacting and thus non-conducting contacts for ensuring that an electric current cannot flow. The non-conducting state can also be referred to as open state or open non-conducting state.

The conducting state of the first switch 34 in the primary operating mode is also referred to as primary conducting state, e.g. primary conducting state of the first switch 34 or first switch primary conducting state.

The non-conducting state of the second switch 36 in the primary operating mode is also referred to as primary non-conducting state, e.g. primary non-conducting state of the second switch 36 or second switch primary non-conducting state.

In an example, not further shown in detail, at least one sensing element is configured to provide a signal in response to a current within the electrical arrangement that exceeds the predetermined threshold. The signal triggers the control signal 38 for the change from the operation switching mode to the overcurrent switching mode.

In an example, the location of the sensing element is selected from the group of source, load, inductive element, or combinations thereof. The sensing elements might also be arranged in a manner, such that their signal, in response to a current within the electrical arrangement that exceeds a predetermined threshold, can trigger the switches directly. Triggering the switches allows to switch the two switches. Here, four possible operating modes of the two switches and their binary combination of conducting state and non-conducting state theoretically are possible.

The clocking of the switches 34, 36 between the four different combinations may not necessarily follow any specific order or sequence and may be adjusted freely to the specific parameter exceeding the threshold in the direct current network. These combinations may also inverse the combination of conducting and non-conducting state of the first and second switches 34, 36 in normal mode.

The higher thermal conductivity of SiC switches may reduce requirements for cooling of the arrangement. The faster switching of SiC switches allows for a shorter reaction time, as compared to conventional contactors.

Figure 3:
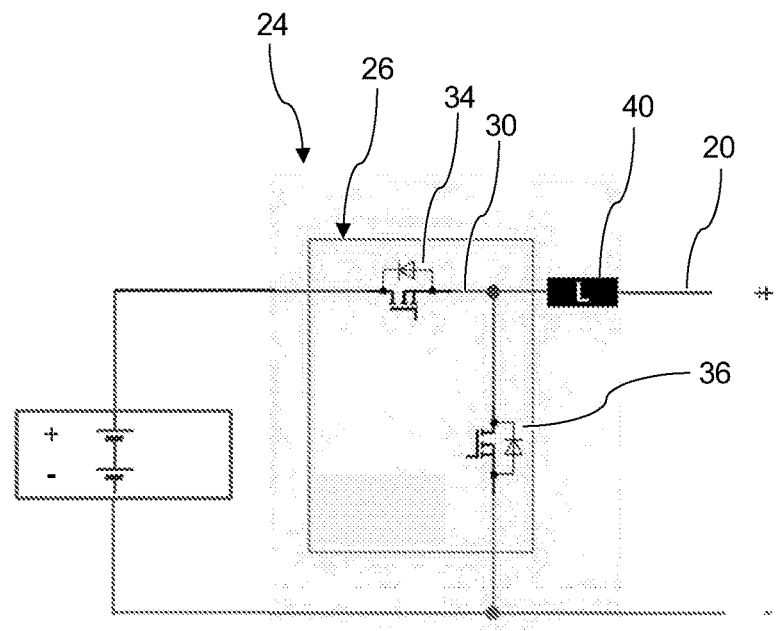
FIG. 3 schematically shows an example of an electric arrangement with one stepping converting component having one switching topology and an inductive element.

FIG. 3 schematically shows an example of the electric arrangement 10 with one stepping converting component having one switching topology and an inductive element 40. The inductive element 40 is connected to the second positive connector 30 of the at least one switching topology 26. The inductive element 40 is configured to take up changes in current and the inductive element is configured to redistribute inductive energy across the network.

In an example, the inductive element 40 is connected to all first switches 34 and second switches 36 of the at least one switching topology 26.

The inductive element 40 is configured to take up changes in current through switching between the operating modes. The changes of current induce opposing changes of current in the inductive element, i.e. an opposing voltage.

The switches 34, 36 are configured to conduct the opposing voltage across the network through switching the switches 34, 36 between the operating modes.

The changes of current and the opposing changes of current add up to compensate each other partly. Therefore, the overall current can be reduced.

In an option of the example of FIG. 3, the inductive element 40 can comprise at least one of the group of: an air core inductor, a choke coil, a soft magnetic core inductor, and a network circuit or a combination thereof.

In example, the inductivity of the inductive element 40 is not fully exploited and the resistance of the inductive element 40 is kept low.

It may be enabled by a discontinuous current.

In an example, in case of a current exceeding the predetermined threshold, the current of the network is reduced in discontinuous steps. The switches are configured to create a discontinuous current. Further, the switches 34, 36 are clocked depending on the current and the voltage of the network.

In an example, the current of the network is reduced discontinuously. In other words, step by step. This discontinuity is provided by the switches 34, 36, which switch on and off the direct current in order to step it down. Further, in an example, the switching frequency of the first and second switches 34, 36 are equal. In a further example, the switching frequency varies. In a further example, the clocking rate, or pulse duty factor, is constant. In another example, the clocking rate, or pulse duty factor, varies, e.g. changes during overprotection mode. The clocking rate refers to clocked time on ($t_{on}$) to clocked time total ($t_{total}$).

Further the switching frequency may be adjusted to the current and voltage of the network, respectively to the changes of voltage and current in the network. Moreover, the switching frequency may be varied depending on the ON/OFF current levels of the switches. The ON/OFF current levels of the switches 34, 36 may further be associated with the predetermined threshold. Input voltage is stepped which leads to output current, depending on the ON/OFF current levels of the switches. There is no requirement for a continuous output current, as it would be necessary for a standard DC-DC converter.

The system aims for the two states ON and OFF of output current and not for a certain conversion of input current to output current. Therefore, no capacitors are required in order to smooth the discontinuous output voltage. An occurring current ripple factor is affected by the inductive element, also referred to as L, and the frequency f. An occurring output voltage ripple factor is affected by the frequency f and the capacity, also referred to as C. Omitting capacitors in the arrangement reduces weight and outline, i.e. size, of the arrangement and reduces complexity of the arrangement.

Figure 4:
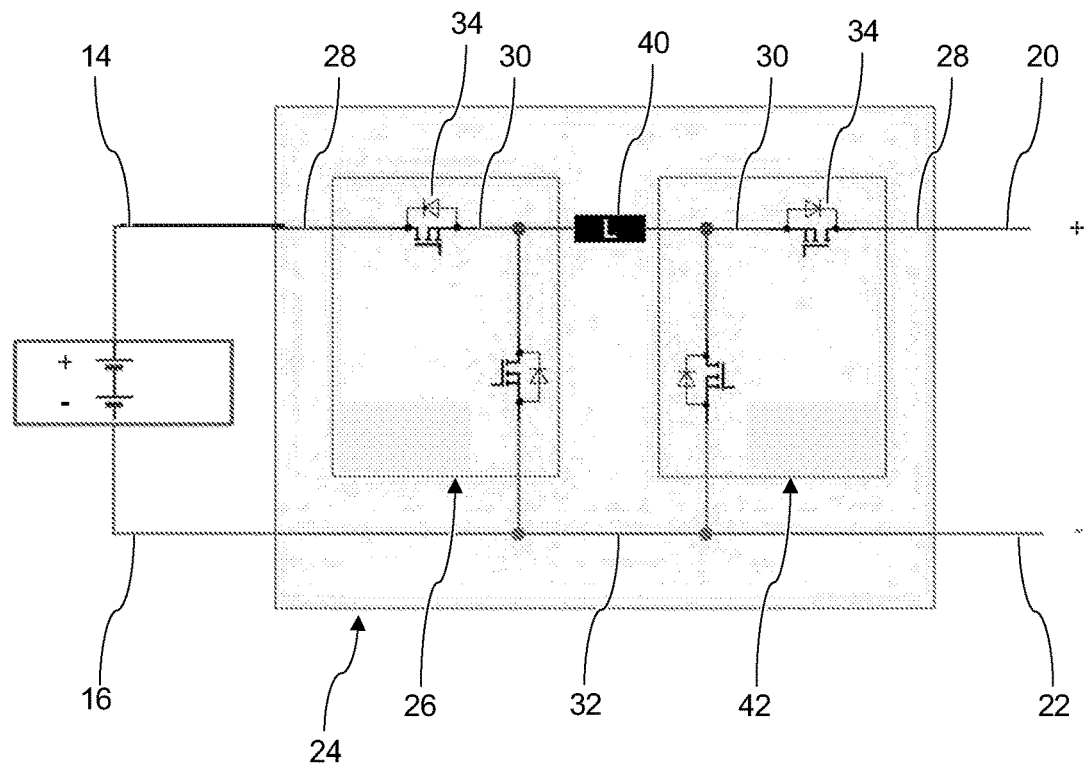
FIG. 4 schematically shows an example of an electric arrangement with one stepping converting component having two switching topologies, which are connected by an inductive element.

FIG. 4 schematically shows an example of the electric arrangement 10 with one stepping converting component 24 having two switching topologies 26, which are connected by the inductive element 40. In FIG. 4, the stepping converting component 10 comprises at least a second switching topology 42 with a first positive connector 28, a second positive connector 30, a ground connector 32, a first switch 34 and a second switch 36. The second positive connector of the first switching topology 26 is connected to the second positive connector of the second switching topology 42. The first switch 34 of the second switching topology is arranged between the second positive connector and the first positive connector of the second switching topology; and the second switch 36 of the second switching topology is arranged between the second positive connector and the ground connector of the second switching topology. The first positive connector of the second switching topology is connected to the positive output terminal 20. The first switching topology and the second switching topology form a bidirectional topology. The first switching topology is configured to conduct changes in a current of a source circuit. Preferably, i.e. as an option, the second switching topology is configured to conduct changes in a current of a load circuit. Further preferably, i.e. as a further option, the stepping converting component is configured to redistribute the changes in current in the network.

The second switching topology is arranged connected in series but mirrored. The two switching topologies, e.g. the two half-bridge modules thus provide protection for flow of an electric current in two opposing directions.

In an example, as indicated in FIG. 4, two switching topologies are provided that are connected in an opposing manner, one of the two switching topologies providing protection in a first current direction and the other one of the two switching topologies providing protection in a second current direction.

In an option of the example shown in FIG. 4, the inductive element 40 is connected between the first switching topology and the second switching topology. The inductive element 40 is configured to take up current by the first switching topology from the source circuit and/or by the second switching topology from the load circuit. The inductive element 40 is configured to redistribute inductive energy across the network by the first switching topology and the second switching topology.

Figure 5:
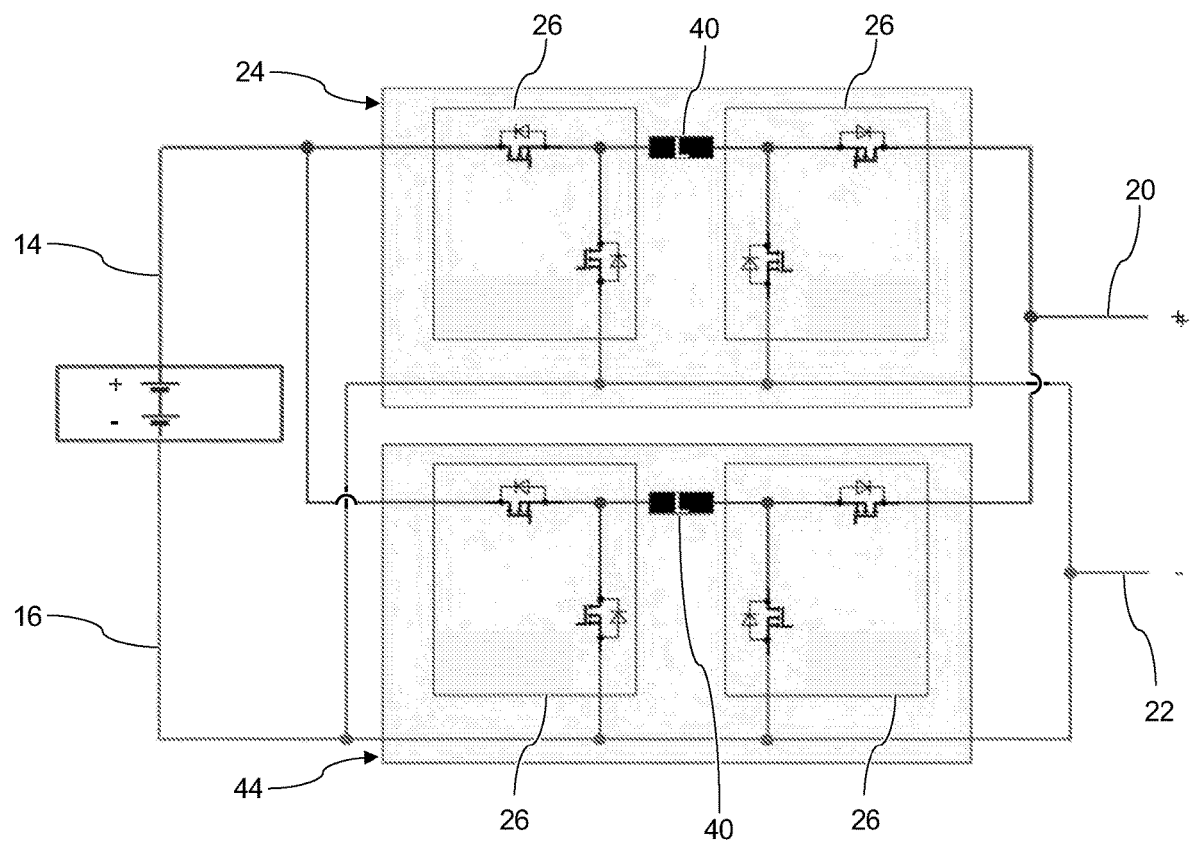
FIG. 5 schematically shows an example of an electric arrangement with two stepping converting components in parallel, each having two switching topologies, which are connected by an inductive element.

FIG. 5 schematically shows an example of an electric arrangement with two stepping converting components 24, 44 in parallel, each having two switching topologies, which are connected by the inductive element 40. In this example, the arrangement has at least two stepping converting components 24, 44 each having at least one switching topology. The two stepping converting components 24, 44 are connected in parallel to the input and output terminals 12, 14, 16, 18.

Preferably, a first stepping converting component 24 of the at least two stepping converting components 24, 44 is configured to operate if the second stepping converting component 44 of the at least two stepping converting 24, 44 components fails; the first stepping converting component 24 is configured to take up current of the second stepping converting component 44.

In an option of the example shown in FIG. 5, the inductive element 40 may be connected between the first switching topology and the second switching topology of the first and/or second stepping converting component.

The first stepping component may for example be configured to take up current of the second stepping component, since it is equipped with i.e. the inductive element.

Thereby the inductive element is enabling both stepping converting components to take up current from each other in case the first stepping converting component or the second stepping converting component fail or are malfunctioning.

The second stepping converting component thus provides an ON state redundancy, while still ensuring safety function in case of an overcurrent.

In an example, the at least two branches are configured to increase the redundancy of the ON-state redundancy. In an example, two stepping converting components are provided, each having at least two switching topologies that are connected in an opposing manner, i.e. mirrored.

The two switching topologies, like the two half-bridge modules, thus provide protection for flow of an electric current in two opposing directions.

Figure 6:
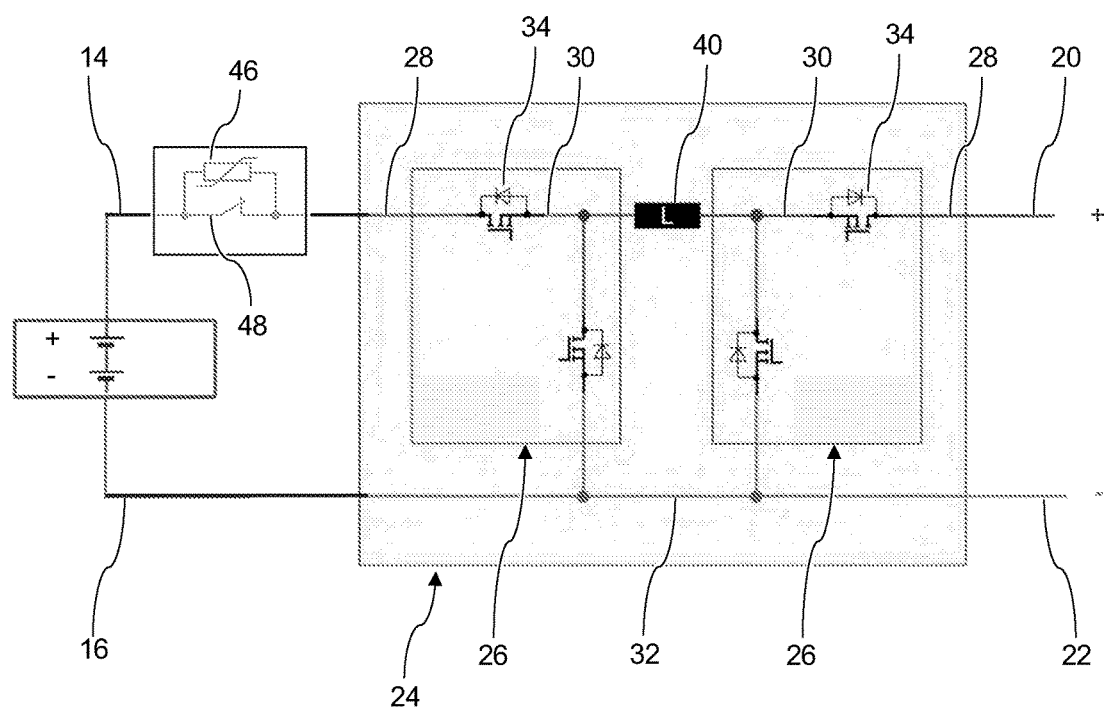
FIG. 6 shows an example of the arrangement with an additional pyro-fuse.

FIG. 6 shows an example of the arrangement with at least one additional pyro-fuse 48. This increases the redundancy of the OFF-state capability of the arrangement. The pyro-fuse 48 thus provides an OFF state redundancy.

The at least one pyro-fuse 48 is provided in the electrical arrangement providing redundant off-switching in case of a semiconductor malfunctioning or a semiconductor damage. The at least one pyro-fuse 48 is arranged between the at least one stepping converting component and one of the terminals. As an option, a voltage limiting device 46 is connected in parallel to the pyro-fuse 48. The voltage limiting device 46 is configured to absorb inductive energy of the network.

In FIG. 6, the pyro-fuse 48 and the voltage limiting device 46 are indicated as provided integrated, such as in a common housing. In an option, they can also be provided separately.

In a further option, two parallel stepping converting component 24 are provided, such as the example shown in FIG. 5, and an example of the pyro-fuse 48 (with or without the voltage limiting device 46) is provided for each of the stepping converting components 24.

In another option, one common example of the pyro-fuse 48 (with or without the voltage limiting device 46) is provided for the stepping converting components 24.

Figure 7:
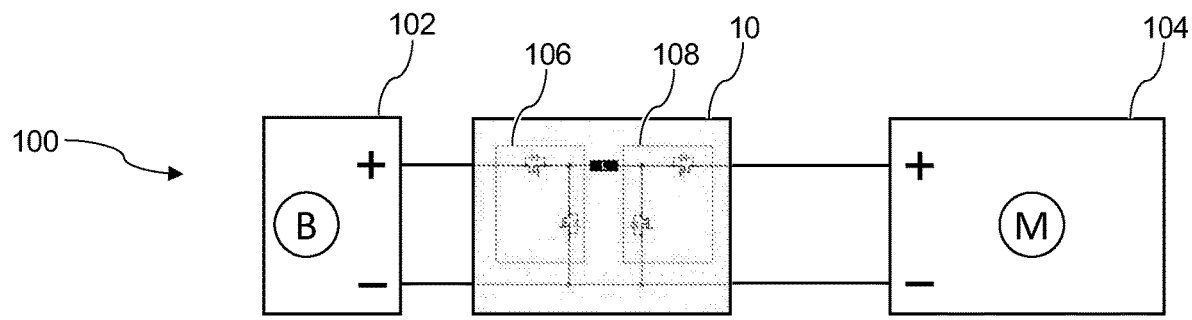
FIG. 7 shows an example of an electric system for direct current networks.

FIG. 7 shows an example of an electric system 100 for direct current networks. The electric system 100 with a direct current network comprises at least one of the group of a source 102 and a load 104. The electric system 100 further comprises an example of the electrical arrangement 10 according to preceding examples and options. The source 102 is connected to the load 104 by the electrical arrangement 10. Further, the source 102 is selected from the group of batteries, super capacitors, fuel cells, solar cells, power network and combinations thereof. The load 104, also referred to load circuit, comprises at least one of the group of: electrical engines, electric drives and motors, electric actuators.

According to an aspect, a protection setup is provided that provides very fast reaction of interrupting, i.e. disconnecting, the circuit in order to be able to prevent high short circuit currents. The protection setup is provided to protect sources as well as to provide protection against high currents from a network or grid.

A range of operation of an example is above 200 V for the voltage. For example, a voltage of 300 V or more is provided. In an example, a nominal voltage of 300 V is provided while having a minimum voltage of 200 V. In another example, a voltage range of 200 to 600 V is provided, such as a voltage range of 300 to 500 V.

A range of operation of an example is above 100 A for the current. For example, a current of 200 A or more is provided. In an example, a current range of 200 to 800 A is provided, such as a current range of 300 to 500 A. In another example, a current of above 1000 A is provided. In a further example, a current of above 2000 A is provided.

It is noted that in case of a lower voltage, a higher current occurs.

As an example, energy sources are provided with high capacities and with low internal impedance. In case of a circuit, rather large currents would occur, like a current of 3600 A in case of an 800 V voltage.

A range of operation of another example is between 500 and 1000 V, e.g. 800 to 850 V, with a current in the range of 300 to 800 A, such as 400 to 500 A.

In another example, also lower voltages and currents as mentioned above are provided. Simply said, examples are provided for a voltage range without a lower figure defining a minimum voltage so-to-speak, and for a current range without a lower FIG. defining a minimum current so-to-speak.

In an example, the arrangement is used as contactor.

In an example, the arrangement is coupled to a PLC.

In an option, a down converter steps down DC current. The inductive element is not saturated as long as short operation duration is enabled.

Besides operating loads, also charging currents can be controlled.

In an example, down-stepping and up-stepping is provided to both sides.

In an example, when a lower charging current is provided, only one switching topology is provided.

As an advantage, the protection can be provided for batteries within a circuit or grid system. The protection can also be provided for switches for coupling two grids or when activating a part of a grid, i.e. a grid-part or subnetwork.

The first switch 34 is configured for a current transmission as a normal state of operation. Switching losses are not of primary interest. The normal state of operation should result in a low impedance.

The second switch 36 is configured for a current blockage or interruption as a normal state of operation.

The switches are thus provided in a different manner.

The bidirectional operation is indicated in FIG. 7 as an option. In an example, the source 102 is a rechargeable battery B, and the load 104 is a motor drive M, e.g. for a vehicle. In a driving mode, the motor drive is operated via supplying electric energy from the source 102 to the load 104. In a recuperation mode, e.g. when the user wants to slow down or brake the vehicle, the motor drive M generates electric energy which is then supplied to the battery B, i.e. from the load 104 to the source 102. The electric current then flows in an opposite direction. When providing two opposing switching topologies, a protection for the network is provided in both directions.

In an option of FIG. 7, the electric arrangement comprises an example of the pyro-fuse 48, e.g. with an example of the voltage limiting device 46.

Figure 8:
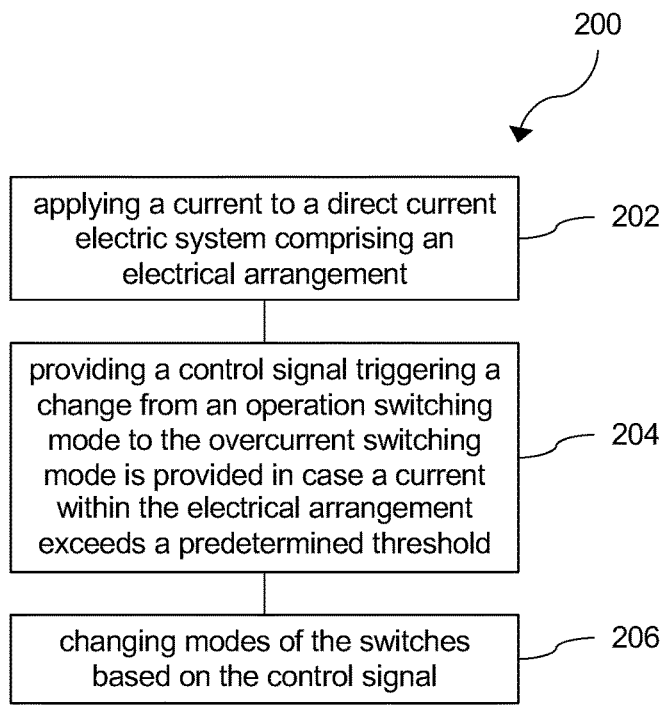
FIG. 8 shows basic steps of an example of a method for protection in a direct current electric system.

FIG. 8 shows basic steps of an example of a method 200 for protection in a direct current electric system. The method 200 comprises the following steps. In a first step 202, a current is applied to a direct current electric system comprising an electrical arrangement according to one of previous options and examples. In a second step 204, a control signal triggering a change from an operation switching mode to the overcurrent switching mode is provided in case a current within the electrical arrangement exceeds a predetermined threshold. In a third step 206, modes of the switches are changed based on the control signal.

In another example, not further shown in detail, it is provided the steps of:
  taking up changes in current by the inductive element;
  redistributing inductive energy across the network; and
  decreasing the current of the system in discontinuous steps.

In an example, the following is provided in an electrical arrangement for switching and protection of direct current networks according to any of the preceding examples:
  detection of changes of voltage or current from the source side or the load side, wherein the changes of voltage or current correspond to overvoltage, circuit short or switching of the direct current network;
  generation of a signal as response of a detection of change;
  activation of bidirectional switches by the signal;
  switching of the bidirectional switches, wherein the switches are switched in a frequency, that the inductive element is not saturated;
  controlled reduction of the current of the network down to zero; and
  in case of switching on, controlled increase of the current of the network.

In an example, the controlled increase of the current of the network is provided for pre-charging of the network.

The term "network" can also be referred to as grid.

It has to be noted that embodiments of the disclosure herein are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure herein has been illustrated and described in detail in the drawings and foregoing description, such illustration and description are to be considered illustrative or example and not restrictive. The disclosure herein is not limited to the disclosed embodiments. Other variations to the disclosed embodiments can be understood and effected by those skilled in the art, from a study of the drawings, and the disclosure.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical arrangement for protection in a direct current electric system, the electrical arrangement comprising:
   an input connection with a positive input terminal and a negative input terminal;
   an output connection with a positive output terminal and a negative output terminal;
   a stepping converting component with at least one switching topology that has a first positive connector, a second positive connector and a ground connector, wherein a first switch is between the first positive connector and the second positive connector, and a second switch is between the second positive connector and the ground connector;
   wherein the negative input terminal and the negative output terminal are connected via the ground connector;
   wherein the at least one switching topology is connected to the positive input terminal by the first positive connector, to the positive output terminal by the second positive connector, and to the interconnected negative input and output terminals by the ground connector;
   wherein the stepping converting component is configured to provide an operation mode for normal operation of the direct current electric system and to provide an overcurrent switching mode for overcurrent operation of the direct current electric system;
   wherein a control signal for triggering a change from the operation mode to the overcurrent switching mode is to be provided to the electrical arrangement in response to a current within the electrical arrangement exceeding a predetermined threshold; and
   wherein the first switch and the second switch are both not clocked to thereby prevent the first switch and the second switch from altering between different switching states during the operation mode.

2. The electrical arrangement according to claim 1, wherein, in the operation mode, the first switch is in a conducting state and the second switch is in a non-conducting state;
   wherein, in the overcurrent switching mode, the first switch is at least temporarily in a non-conducting state and the second switch is at least temporarily in a conducting state;
   wherein the first switch and the second switch are clocked to alter between different switching states during the overcurrent switching mode;
   wherein, in the overcurrent switching mode, the clocking triggers different combinations of the conducting state and non-conducting state of the first switch and the second switch; and
   wherein the switches are configured to operate mostly in the operation switching mode for normal operation.

3. The electrical arrangement according to claim 1, comprising at least one sensing element configured to provide a signal in response to a current within the electrical arrangement exceeding the predetermined threshold;
   wherein the signal triggers the control signal for the change from the operation mode to the overcurrent switching mode.

4. The electrical arrangement according to claim 1, wherein the at least one switching topology is a half-bridge module;
   wherein the stepping converting component is a semiconductor circuit; and
   wherein a switching by the semiconductor circuits within less than a few microseconds is provided.

5. The electrical arrangement according to claim 1, further comprising an inductive element connected to the second positive connector of the at least one switching topology;
   wherein the inductive element is configured to take up changes in current; and
   wherein the inductive element is configured to redistribute inductive energy across the electrical arrangement.

6. The electrical arrangement according to claim 5, wherein the inductive element is at least one of the group consisting of an air core inductor, a choke coil, a soft magnetic core inductor, and a network circuit.

7. The electrical arrangement according to claim 1, wherein, in response to the current exceeding the predetermined threshold, the current of the electrical arrangement is reduced in discontinuous steps;
   wherein the switches are configured to create a discontinuous current; and
   wherein the switches are clocked depending on the current and a voltage of the electrical arrangement.

8. The electrical arrangement according to claim 1, wherein the stepping converting component comprises at least a second switching topology with a first positive connector, a second positive connector, a ground connector, a first switch and a second switch;
  wherein the second positive connector of the first switching topology is connected to the second positive connector of the second switching topology;
  wherein the first switch of the second switching topology is between the second positive connector and the first positive connector of the second switching topology, and the second switch of the second switching topology is between the second positive connector and the ground connector of the second switching topology;
  wherein the first positive connector of the second switching topology is connected to the positive output terminal;
  wherein the first switching topology and the second switching topology form a bidirectional topology;
  wherein the first switching topology is configured to conduct changes in a current of a source circuit, and wherein the second switching topology is configured to conduct changes in a current of a load circuit; and
  wherein, the stepping converting component is configured to redistribute the changes in current in the electrical arrangement.

9. The electrical arrangement according to claim 1, wherein two switching topologies are provided that are connected in an opposing manner, one of the two switching topologies providing protection in a first current direction and another of the two switching topologies providing protection in a second current direction.

10. The electrical arrangement according to claim 8, wherein an inductive element is connected between the first switching topology and the second switching topology;
  wherein the inductive element is configured to take up current by the first switching topology from the source circuit or by the second switching topology from the load circuit; and
  wherein the inductive element is configured to redistribute inductive energy across the electrical arrangement by the first switching topology and the second switching topology.

11. The electrical arrangement according to claim 1, wherein at least two stepping converting components each having at least one switching topology are connected in parallel to the input and output terminals;
  wherein a first stepping converting component of the at least two stepping converting components is configured to operate if the second stepping converting component of the at least two stepping converting components fails; and
  wherein the first stepping converting component is configured to take up current of the second stepping converting component.

12. The electrical arrangement according to claim 1, wherein at least one pyro-fuse is provided in the electrical arrangement providing redundant off-switching in response to a semiconductor malfunctioning or a semiconductor damage;
  wherein the at least one pyro-fuse is between the at least one stepping converting component and one of the terminals; and
  wherein a voltage limiting device is connected in parallel to the pyro-fuse, the voltage limiting device being configured to absorb inductive energy of the electrical arrangement.

13. An electric system with a direct current network, the system comprising:
  a source and a load; and
  an electrical arrangement according to claim 1;
  wherein the source and the load are connectable by the electrical arrangement,
  wherein the source is selected from the group consisting of batteries, super capacitors, fuel cells, solar cells, and a power network; and
  wherein the load comprises at least one of the group consisting of electrical engines, electric drives and motors, and electric actuators.

14. The system according to claim 13, wherein the electrical arrangement is configured to handle voltages larger than 300 V, or voltages larger than 800 V, and currents larger than 200 A, or currents larger than 1000 A.

15. A method for protection in a direct current electric system, the method comprising:
  applying a current to the direct current electric system comprising an electric system with a direct current network, the electric system comprising:
    a source and a load; and
    an electrical arrangement according to claim 1;
    wherein the source and the load are connectable by the electrical arrangement,
    wherein the source is selected from the group consisting of batteries, super capacitors, fuel cells, solar cells, and a power network; and
    wherein the load comprises at least one of the group consisting of electrical engines, electric drives and motors, and electric actuators;
  providing the control signal triggering the change from the operation mode to the overcurrent switching mode in response to the current within the electrical arrangement exceeding the predetermined threshold; and
  changing modes of the switches based on the control signal.

* * * * *

UNITED STATES PATENT AND TRADEMARK OFFICE
CERTIFICATE OF CORRECTION

PATENT NO. : 12,444,931 B2
APPLICATION NO. : 18/230991
DATED : October 14, 2025
INVENTOR(S) : Gerhard Steiner and Florian Kapaun It is certified that error appears in the above-identified patent and that said Letters Patent is hereby corrected as shown below:

In the Claims

Column 14 Line 31: "operation switching mode for normal operation." should be -- operation mode for normal operation. --.

Signed and Sealed this
Sixteenth Day of December, 2025

John A. Squires
*Director of the United States Patent and Trademark Office*